US012592001B2

(12) United States Patent
Maehara et al.

(10) Patent No.: US 12,592,001 B2
(45) Date of Patent: Mar. 31, 2026

(54) EXCREMENT DETERMINATION METHOD, EXCREMENT DETERMINATION DEVICE, AND NON-TRANSITORY COMPUTER READABLE RECORDING MEDIUM

(71) Applicant: PANASONIC HOLDINGS CORPORATION, Osaka (JP)

(72) Inventors: Hideyuki Maehara, Osaka (JP); Hirofumi Kanai, Osaka (JP); Yuka Yamada, Nara (JP)

(73) Assignee: PANASONIC HOUSING SOLUTIONS CO., LTD., Osaka (JP)

( * ) Notice: Subject to any disclaimer, the term of this patent is extended or adjusted under 35 U.S.C. 154(b) by 341 days.

(21) Appl. No.: 18/217,180

(22) Filed: Jun. 30, 2023

(65) Prior Publication Data

US 2023/0351637 A1 Nov. 2, 2023

Related U.S. Application Data

(63) Continuation of application No. PCT/JP2021/040781, filed on Nov. 5, 2021.

(60) Provisional application No. 63/134,395, filed on Jan. 6, 2021.

(30) Foreign Application Priority Data

Sep. 14, 2021 (JP) ................................. 2021-149214

(51) Int. Cl.
*G06T 7/90* (2017.01)

(52) U.S. Cl.
CPC ...... *G06T 7/90* (2017.01); *G06T 2207/10024* (2013.01); *G06T 2207/30004* (2013.01)

(58) Field of Classification Search
CPC ................. G06T 7/90; G06T 7/10–194; G06T 2207/10024; G06T 2207/30004
See application file for complete search history.

(56) References Cited

U.S. PATENT DOCUMENTS

| 4,567,042 A | 1/1986 | Acree et al. |
| 4,567,043 A | 1/1986 | Acree et al. |
| 2003/0228038 A1* | 12/2003 | Douglass ................. G06T 7/60 |
| | | 382/128 |

(Continued)

FOREIGN PATENT DOCUMENTS

| JP | 2016-4005 | 1/2016 |
| JP | 2018-65807 | 4/2018 |

(Continued)

OTHER PUBLICATIONS

Dec. 7, 2021 International Search Report issued in International Pat. Appl. No. PCT/JP2021/040781, along with an English translation thereof.

*Primary Examiner* — Sean T Motsinger
(74) *Attorney, Agent, or Firm* — GREENBLUM & BERNSTEIN, P.L.C.

(57) ABSTRACT

An excrement determination device acquires image data of excrement captured by a camera which is provided to photograph an inner part of a bowl of a toilet, calculates a G/R value and a B/R value on the basis of an R (red) value, a G (green) value, and a B (blue) value each included in the image data, determines, on the basis of the G/R value and the B/R value, whether the image data includes an image of at least one of urine, feces, and blood, and outputs a result of the determination.

12 Claims, 12 Drawing Sheets

(56) References Cited

U.S. PATENT DOCUMENTS

| | | | |
|---|---|---|---|
| 2003/0231791 A1* | 12/2003 | Torre-Bueno | G06T 5/50 |
| | | | 382/133 |
| 2014/0005264 A1 | 1/2014 | Soni | |
| 2017/0303901 A1* | 10/2017 | Sekine | G01N 21/314 |
| 2018/0085334 A1 | 3/2018 | Soni | |
| 2018/0303466 A1* | 10/2018 | Kashyap | A61B 10/0038 |
| 2019/0183839 A1 | 6/2019 | Soni | |
| 2019/0298316 A1 | 10/2019 | Kashyap et al. | |
| 2020/0008786 A1 | 1/2020 | Sekine | |
| 2020/0100725 A1* | 4/2020 | Temanson | A61B 5/48 |
| 2022/0039357 A1* | 2/2022 | Roth | A01K 1/01 |
| 2022/0237906 A1* | 7/2022 | Ueda | G06V 10/7747 |
| 2023/0012841 A1* | 1/2023 | Yamada | E03D 9/00 |
| 2023/0071883 A1* | 3/2023 | Kanai | E03D 11/13 |
| 2023/0074448 A1* | 3/2023 | Kanai | G01N 33/497 |
| 2023/0085953 A1* | 3/2023 | Mori | A61B 5/6887 |
| | | | 348/148 |
| 2023/0117389 A1* | 4/2023 | Kanai | G06T 7/90 |
| | | | 382/128 |
| 2023/0122501 A1* | 4/2023 | Kanai | E03D 11/00 |
| | | | 382/128 |
| 2023/0306724 A1* | 9/2023 | Maehara | E03D 9/00 |
| 2023/0351637 A1* | 11/2023 | Maehara | G01N 33/483 |
| 2023/0358027 A1* | 11/2023 | Kanai | G06V 40/103 |
| 2023/0360206 A1* | 11/2023 | Kanai | G06T 7/62 |

FOREIGN PATENT DOCUMENTS

| | | |
|---|---|---|
| JP | 2020-516422 | 6/2020 |
| JP | 2020-187089 | 11/2020 |
| WO | 85/00014 | 1/1985 |

* cited by examiner

FIG.8

| CONDITION | G/R (%) | | B/R (%) | |
|---|---|---|---|---|
| | Low | High | Low | High |
| FECES | 0 | A1 | 0 | A2 |
| URINE | B1 | B2 | B3 | B4 |
| BLOOD | 0 | C1 | 0 | C2 |

FIG.11

| CONDITION | G/R (%) | | B/R (%) | | R | | G | | B | |
|---|---|---|---|---|---|---|---|---|---|---|
| | Low | High | Low | High | Low | High | Low | High | Low | High |
| BLACKISH FECES | D1 | D2 | D3 | D4 | 0 | E | 0 | E | 0 | E |

FIG.12

| CONDITION | R | | G | | B | |
|---|---|---|---|---|---|---|
| | Low | High | Low | High | Low | High |
| ORANGISH FECES | F1 | F2 | F1 | F2 | F1 | F2 |

EXCREMENT DETERMINATION METHOD, EXCREMENT DETERMINATION DEVICE, AND NON-TRANSITORY COMPUTER READABLE RECORDING MEDIUM

TECHNICAL FIELD

The present disclosure relates to a technology of determining excrement on the basis of image data.

BACKGROUND ART

Patent Literature 1 discloses a technology of converting a color image into a grayscale image, calculating gradient magnitudes of an image from the grayscale image, binning the calculated gradient magnitudes of the image into a histogram of a fixed step size, inputting the histogram with the binned magnitudes to a classifier, such as a support vector machine, and determining stool or feces consistency.

However, the technology of Patent Literature 1 needs further improvement to accurately detect excrement in pooled water in a toilet.

CITATION LIST

Patent Literature

Patent Literature 1: Japanese Unexamined Patent Publication No. 2020-516422

SUMMARY OF INVENTION

The present disclosure has been achieved to solve the drawbacks, and has an object of providing a technology of accurately detecting excrement in pooled water in a toilet.

An excrement determination according to one aspect of this disclosure is an excrement determination method for an excrement determination device that determines excrement. The excrement determination method includes: by a processor included in the excrement determination device, acquiring image data of excrement in color captured by a camera which is provided to photograph an inner part of a bowl of the toilet; calculating a G/R value and a B/R value on the basis of an R (red) value, a G (green) value, and a B (blue) value each included in the image data; determining, on the basis of the G/R value and the B/R value, whether the image data includes an image of at least one of urine, feces, and blood; and outputting a result of the determination.

This disclosure achieves accurate detection of excrement in pooled water in a toilet.

BRIEF DESCRIPTION OF DRAWINGS

FIG. 8 is a table listing a feces condition, a urine condition, and a blood condition.

FIG. 11 is a table showing a blackish feces condition.

FIG. 12 is a table showing an orangish feces condition.

DETAILED DESCRIPTION

Figure 1:
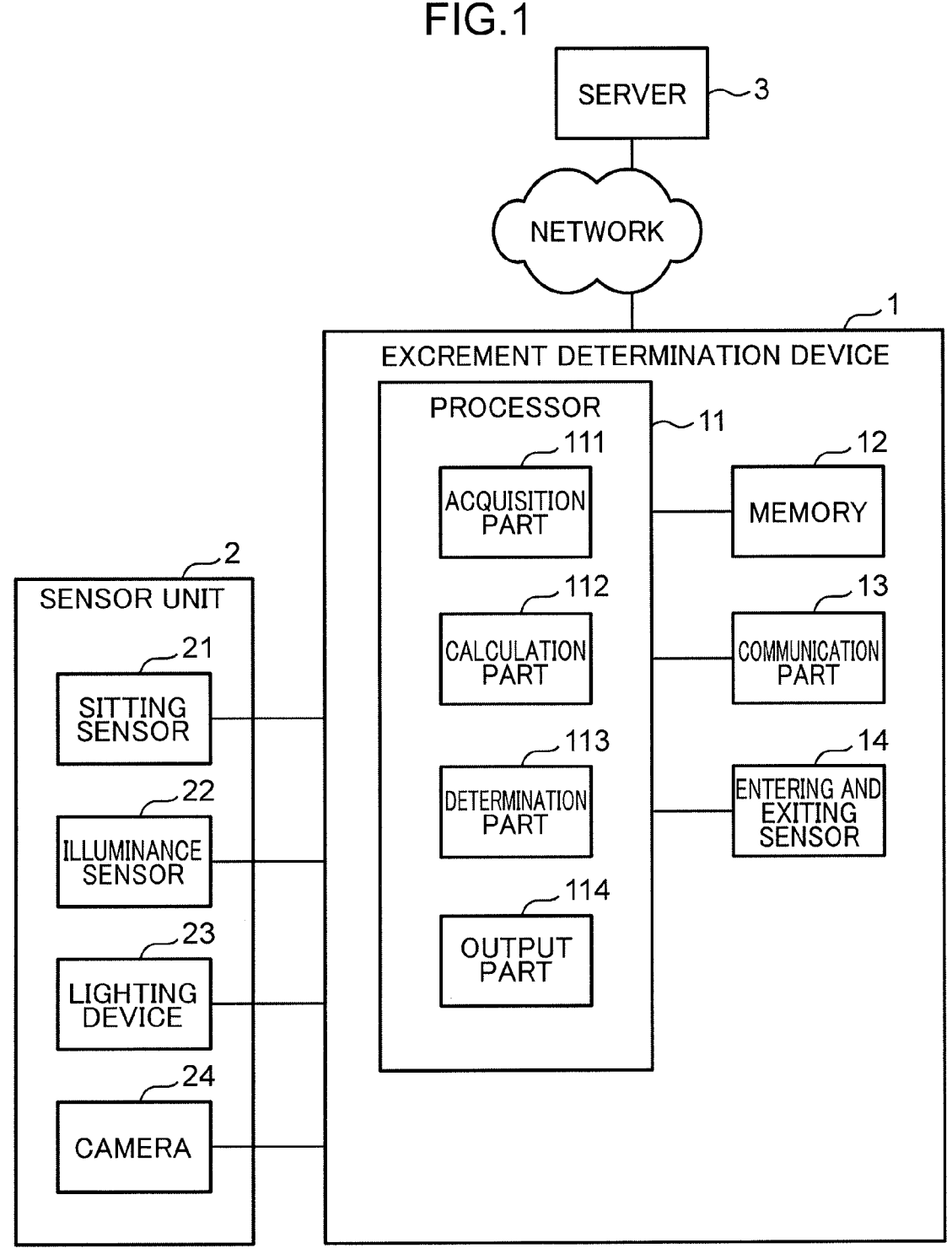
FIG. 1 is a diagram showing a configuration of an excrement determination system in a first embodiment of the present disclosure.

Knowledge Forming the Basis of the Present Disclosure

In a care facility, excretion information including a frequency and a time of excretion about a care receiver is important to grasp a possible health risk of the care receiver. However, recordation of the excretion information by a caregiver or carer results in increasing the burden on the caregiver. Execution of the recordation of the excretion information by the caregiver near the care receiver increases a psychological burden on the care receiver. Thus, there has been a demand for recognition of excrement from image data captured by a camera which is located at a toilet, generation of excretion information based on a result of the recognition, and automatic recordation of the generated excretion information.

However, excrement in a surface layer of pooled water which is pooled in a water pool part of a bowl of a toilet gradually sinks into the bottom thereof, and accordingly, the color of the excrement fades or becomes lighter over time. Thus, there is a drawback that only detection of the excrement using an R value, a G value, and a B value of image data is insufficient to accurately detect the excrement.

This disclosure has been achieved to solve the drawback described above.

An excrement determination according to one aspect of this disclosure is an excrement determination method for an excrement determination device that determines excrement. The excrement determination method includes: by a processor included in the excrement determination device; acquiring image data of excrement in color captured by a camera which is provided to photograph an inner part of a bowl of the toilet; calculating a G/R value and a B/R value on the basis of an R (red) value, a G (green) value, and a B (blue) value each included in the image data; determining, on the basis of the G/R value and the B/R value, whether the image data includes an image of at least one of urine, feces, and blood; and outputting a result of the determination.

This configuration includes: calculating a G/R value and a B/R value on the basis of an R value, a B value, and a G value each included in image data; and determining whether the image data includes an image of at least one of urine, feces, and blood, on the basis of the calculated G/R value and B/R value. Here, each of the G/R value and the B/R value has characteristics that the value is maintainable even when the color of the excrement in the surface layer of the pooled water fades or becomes lighter over time as the excrement in the surface layer of the pooled water gradually sinks into the bottom thereof. As a result, even when the color of the excrement in the surface layer of the pooled water fades over time due to the influence of the pooled water in the toilet, an image of the excrement is accurately detectable.

In the excrement determination method, in the determining, the image data may be determined to include an image of the feces when each of the G/R value and the B/R value satisfies a predetermined feces condition, the image data may be determined to include an image of the urine when each of the G/R value and the B/R value satisfies a predetermined urine condition, and the image data may be determined to include an image of the blood when each of the G/R value and the B/R value satisfies a predetermined blood condition.

This configuration enables accurate determination of an image of each of the feces, the urine, and the blood from the image data.

In the excrement determination method, in the determining, the image data may be determined to include an image of blackish feces when each of the G/R value, the B/R value, the R value, the G value, and the B value satisfies a predetermined blackish feces condition.

In this configuration, the image data is determined to include an image of blackish faces when each of the R value, the G value, and the B value satisfies the predetermined blackish feces condition in addition to the G/R value and the B/R value, and thus, the configuration enables accurate detection that the image data includes an image of blackish feces.

In the excrement determination method, in the determining, the image data may be determined to include an image of orangish feces when each of the R value, the G value, and the B value satisfies a predetermined orangish feces condition.

This configuration enables accurate detection that the image data includes an image of orangish feces.

In the excrement determination method, the feces condition may include a condition that the G/R value is smaller than A1% and the B/R value is smaller than A2% which is less than A1%.

This configuration enables accurate detection that the image data includes an image of feces.

In the excrement determination method, the urine condition may include a condition that the G/R value ranges from B1% to B2%, and the B/R value ranges from B3% to B4%, B3% being less than B1%, B4% being less than B2%.

This configuration enables accurate detection that the image data includes an image of urine.

In the excrement determination method, the blood condition may include a condition that the G/R value is smaller than C1% and the B/R value is smaller than C2% which is less than C1%.

This configuration enables accurate detection that the image data includes an image of blood.

In the excrement determination method, the blackish feces condition may include a condition that the G/R value ranges from D1% to D2%, the B/R value ranges from D3% to D4%, and that each of the R value, G value, and the B value is smaller than E, D3% being less than D1%, D4% being equal to D2%.

This configuration enables accurate detection that the image data includes an image of blackish feces.

In the excrement determination method, the orangish feces condition may include a condition that each of the R value, the G value, and the B value ranges from F1 to F2.

This configuration enables accurate detection that the image data includes an image of orangish feces.

In the excrement determination method, in the determining, the image data may be determined to include an image of the feces when the image data includes data of a first number of or more pixels that satisfies the feces condition, the image data may be determined to include an image of the urine when the image data includes data of a second number of or more pixels that satisfies the urine condition, and the image data may be determined to include an image of blood when the image data includes data of a third number of or more pixels that satisfies the blood condition.

This configuration attains accurate distinction between a mere noise and feces in pixel data satisfying the feces condition. This configuration further succeeds in accurate distinction between a mere noise and urine in pixel data satisfying the urine condition. The configuration additionally achieves accurate distinction between a mere noise and blood in pixel data satisfying the blood condition.

In the excrement determination method, in the calculating, the G/R value and the B/R value may be determined on the basis of an R value, a G value, and a B value of image data of a predetermined detection area including a pool part of the toilet.

This configuration facilitates the detection of excrement, and thus, a relevant processing load is smaller than a load required for detection of excrement from whole image data.

An excrement determination device according to another aspect of the disclosure is an excrement determination device that determines excrement. The excrement determination device includes: an acquisition part that acquires image data of excrement in color captured by a camera which is provided to photograph a bowl of the toilet; a calculation part that calculates a G/R value and a B/R value on the basis of an R (red) value, a G (green) value, and a B (blue) value each included in the image data; a determination part that determines, on the basis of the G/R value and the B/R value, whether the image data includes an image of at least one of feces, urine, and blood; and an output part that outputs a result of the determination.

With this configuration, it is possible to provide an excrement determination device that exerts operational effects equivalent to those of the excrement determination method described above.

An excrement determination program according to still another aspect of the disclosure is an excrement determination program that causes a computer to serve as an excrement determination device. The excrement determination program includes causing a computer to execute: acquiring image data of excrement in color captured by a camera which is provided to photograph an inner part of a bowl of the toilet; calculating a G/R value and a B/R value on the basis of an R (red) value, a G (green) value, and a B (blue) value each included in the image data; determining, on the basis of the G/R value and the B/R value, whether the image data includes an image of at least one of urine, feces, and blood; and outputting a result of the determination.

With this configuration, it is possible to provide an excrement determination program that exerts operational effects equivalent to those of the excrement determination method described above.

This disclosure can be realized as an excrement determination system caused to operate by the excrement determination program. Additionally, it goes without saying that the computer program is distributable as a non-transitory computer readable storage medium like a CD-ROM, or distributable via a communication network like the Internet.

Each of the embodiments which will be described below represents a specific example of the disclosure. Numeric values, shapes, constituent elements, steps, and the order of the steps described below are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

Figure 2:
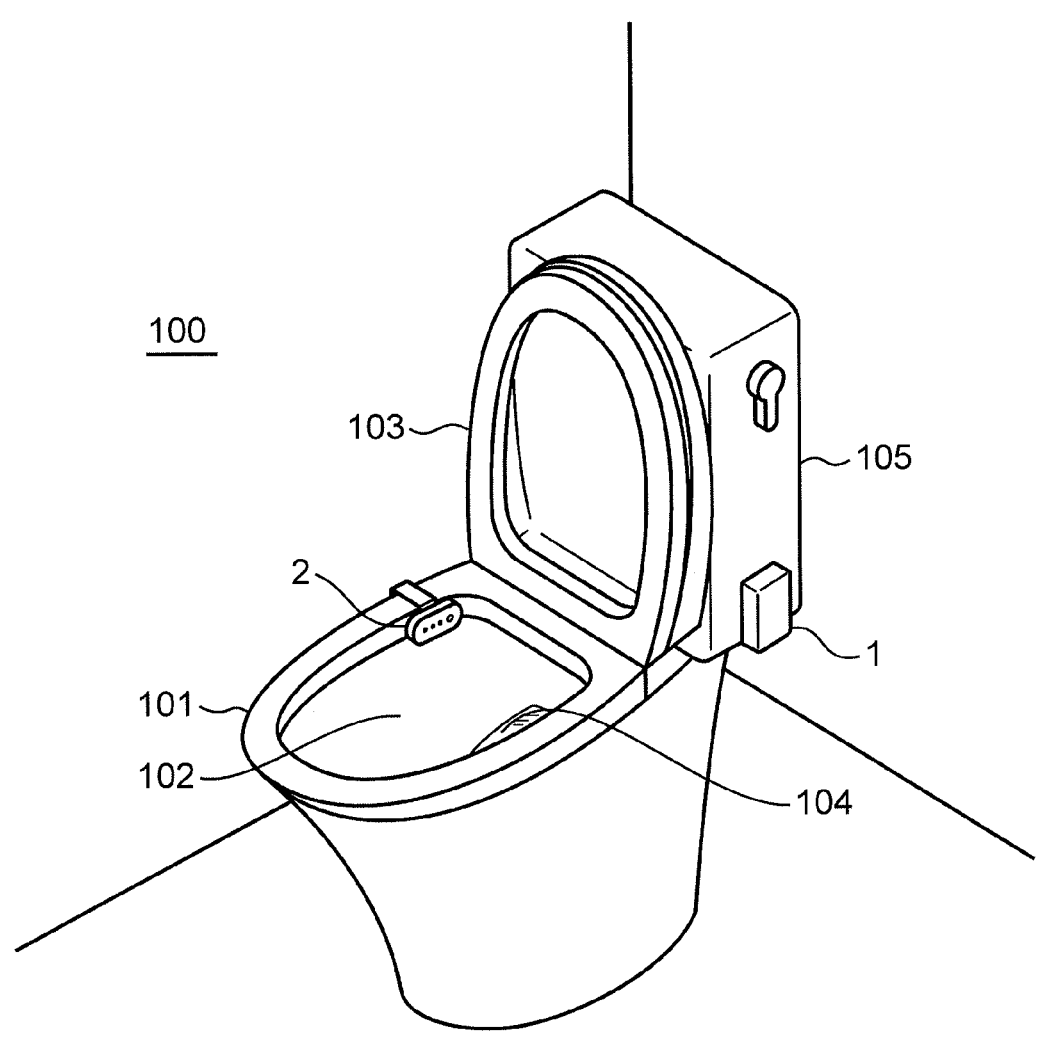
FIG. 2 is a view explaining arrangement positions of a sensor unit and an excrement determination device in the first embodiment of the disclosure.

FIG. 1 is a diagram showing a configuration of an excrement determination system in a first embodiment of the present disclosure. FIG. 2 is a view explaining arrangement positions of a sensor unit 2 and an excrement determination device 1 in the first embodiment of the disclosure.

The excrement determination system shown in FIG. 1 includes the excrement determination device 1, the sensor unit 2, and a server 3. The excrement determination device 1 determines, on the basis of image data captured by a camera 24, whether excretion by a user occurs. The excrement determination device 1 is arranged, for example, on a side surface of a water reservoir tank 105 as shown in FIG. 2. However, this is just an example, and the excrement determination device 1 may be arranged on a wall of a toilet room or imbedded in the sensor unit 2. Thus, an arrangement position of the device is not particularly limited. The excrement determination device 1 is connected to the server 3 via a network. The network includes, for example, a wide area network like the internet. The server 3 manages excretion information about the user generated by the excrement determination device 1.

The sensor unit 2 is attached, for example, onto a fringe part 101 of a toilet 100 as shown in FIG. 2. The sensor unit 2 is communicably connected to the excrement determination device 1 via a predetermined communication channel. The communication channel may include a wireless channel, such as the Bluetooth (registered mark) or a wireless LAN, or a wired LAN.

As shown in FIG. 2, the toilet 100 includes the fringe part 101 and a bowl 102. The fringe part 101 is located at an upper end of the toilet 100 and defines an opening section of the toilet 100. The bowl 102 is located below the fringe part 101 to receive feces and urine.

The bowl 102 has a bottom provided with a pool part 104 for pooling water (pooled water). The pool part 104 is provided with an unillustrated drain hole. The feces and the urine excreted in the bowl 102 is caused to flow to a sewage pipe through the drain hole. In other words, the toilet 100 is in the form of a toilet of a flush type. A toilet seat 103 is provided on the top of the toilet 100 to allow the user to sit thereon. The toilet seat 103 is rotatable upward and downward. The user sits on the toilet seat 103 lowered to lie on the fringe part 101. The water reservoir tank 105 that stores flush water to cause the feces and the urine to flow is provided in the rear of the toilet 100.

Referring back to FIG. 1, the sensor unit 2 includes a sitting sensor 21, an illuminance sensor 22, a lighting device 23, and the camera 24. Each of the sitting sensor 21 and the illuminance sensor 22 serves as an example of a sensor that detects sitting and leaving of the user onto and from the toilet 100.

The sitting sensor 21 is arranged at the toilet 100 to measure a distance to the buttocks of the user sitting on the toilet 100. The sitting sensor 21 is configured by, for example, a distance measurement sensor to measure a distance value indicating the distance to the buttocks of the user sitting on the toilet 100. One example of the distance measurement sensor is an infrared distance measurement sensor. The sitting sensor 21 measures the distance value at a predetermined sampling rate, and inputs the measured distance value to the excrement determination device 1 at a predetermined sampling rate. The sitting sensor 21 serves as an example of the sensor that detects a sitting state of the user. The distance value serves as an example of sensing data indicating each of sitting and leaving of the user.

The illuminance sensor 22 is arranged at the toilet 100 to measure illuminance in the bowl 102. The illuminance sensor 22 measures illuminance or an illuminance value in the bowl 102 at a predetermined sampling rate, and inputs the measured illuminance value to the excrement determination device 1 at a predetermined sampling rate. The illuminance value serves as an example of the sensing data indicating each of the sitting and the leaving of the user.

The lighting device 23 is arranged at the toilet 100 to light up the inside of the bowl 102. The lighting device 23 is, for example, a white LED to light up the inside of the bowl 102 under a control of the excrement determination device 1.

The camera 24 is located at the toilet 100 to photograph the bowl 102. For instance, the camera 24 has a high sensitivity and a wide angle, and is configured to capture a color image having an R (red) component, a G (green) component, and a B (blue) component. The camera 24 photographs an inner part of the bowl 102 at a predetermined frame rate, and inputs obtained image data to the excrement determination device 1 at a predetermined sampling rate.

The excrement determination device 1 includes a processor 11, a memory 12, a communication part 13, and an entering and exiting sensor 14.

For instance, the processor 11 includes a center processing unit (CPU) or an ASIC (application specific integrated circuit). The processor 11 has an acquisition part 111, a calculation part 112, a determination part 113, and an output part 114. Each of the acquisition part 111 to the output part 114 may be realized when the CPU executes an excrement determination program, or may be established in the form of a dedicated hardware circuit.

The acquisition part 111 acquires the image data captured by the camera 24 at a predetermined sampling rate. The acquisition part 111 acquires the distance value measured by the sitting sensor 21 at a predetermined sampling rate. The acquisition part 111 further acquires the illuminance value measured by the illuminance sensor 22 at a predetermined sampling rate.

The calculation part 112 calculates a G/R value and a B/R value on the basis of an R value, a G value, and a B value each included in the image data acquired by the acquisition part 111. Specifically, the calculation part 112 sets a detection area D1 (FIG. 3) on the image data acquired by the acquisition part 111, and calculates a G/R value and a B/R value for each of pixels of data or pixel data constituting the detection area D1. The G/R value means a value obtained by dividing the G value by the R value and expressed with %. The B/R value means a value obtained by dividing the B value by the R value and expressed with %. The R value represents a gradation value of an R (red) component of pixel data, the G value represents a gradation value of a G (green) component of the pixel data, and the B value represents a gradation value of a B (blue) component of the pixel data. Each of the R value, the G value, and the B value takes, for example, a value of eight bits (0 to 255). However, this is just an example, and each of the R value, the G value, and the B value may be expressed with another bit number.

Figure 3:
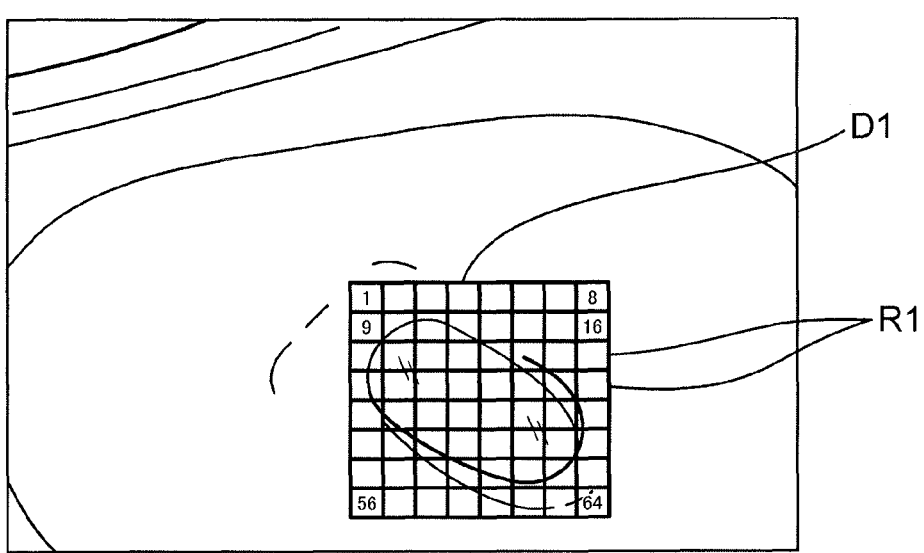
FIG. 3 shows an example of a detection area.

FIG. 3 shows the detection area D1 The detection area D1 denotes a rectangular area containing the pool part 104 of the toilet 100. The calculation part 112 may read out setting information from the memory 12, and set the detection area D1 on the image data in accordance with the setting information. The setting information indicates predetermined coordinate information indicating a coordinate for the detection area D1 in the image data. The toilet 100 is designed to receive excrement in the pool part 104. Thus, setting of the detection area D1 to the pool part 104 and detection of the excrement from the detection area D1 lead to a smaller processing burden than a burden in detection of excrement from whole image data.

The calculation part 112 may remove pixel data having a color (reference toilet color) indicated by reference toilet color data from the image data (hereinafter, referred to as detection area data) of the detection area D1, and calculate a G/R value and a B/R value for each pixel of detection area data remaining after the removal (hereinafter, referred to as determination target image data). The calculation part 112 may remove, from the detection area data, pixel data having an R value, a G value, and a B value each falling within a predetermined range in the detection area data with respect to each of the R value, the G value, and the B value of the reference toilet color.

Here, the reference toilet color data may be calculated on the basis of image data of a reference region in the bowl 102, the region being at a predetermined distance away from the fringe part 101 of the toilet 100 toward the pool part 104. Specifically, the reference toilet color data has an average value of R values, an average value of G values, and an average value of B values in the reference region. A region just under the fringe part 101 is hard to clean and remove a stain therefrom. Thus, setting of this region to the reference region results in a difficulty in calculating the reference toilet color data correctly indicating the color of the toilet 100. The calculation part 112 thus calculates the reference toilet color data on the basis of image data of a region at the predetermined distance from the fringe part 101.

The determination part 113 determines, on the basis of the G/R value and the B/R value calculated by the calculation part 112, whether the image data includes an image of each of urine, feces, and blood. In detail, the determination part 113 may determine that the image data includes an image of urine when each of the G/R value and the B/R value satisfies a predetermined urine condition. The determination part 113 may further determine that the image data includes an image of feces when each of the G/R value and the B/R value satisfies a predetermined feces condition. The determination part 113 may further determine that the image data includes an image of blood when each of the G/R value and the B/R value satisfies a predetermined blood condition. The feces condition, the urine condition, and the blood condition will be described in detail later.

The determination part 113 may determine that the image data includes an image of the urine when the determination target image data includes data of a first number of or more pixels that satisfies the urine condition. The determination part 113 may further determine that the image data includes an image of the feces when the determination target image data includes data of a second number of or more pixels that satisfies the feces condition. The determination part 113 may further determine that the image data includes an image of the blood when the determination target image data includes data of a third number of or more pixels that satisfies the blood condition. The first number of pixels represents a preset number of pixels of pixel data that satisfies the urine condition, the pixel data not indicating a noise but indicating pixel data of urine. The second number of pixels represents a preset number of pixels of pixel data that satisfies the feces condition, the pixel data not indicating a noise but indicating pixel data of feces. The third number of pixels represents a preset number of pixels of pixel data that satisfies the blood condition, the pixel data not indicating a noise but indicating pixel data of blood.

The output part 114 generates excretion information including a result of the determination by the determination part 113, and outputs the generated excretion information. The output part 114 may transmit the excretion information to the server 3 by using the communication part 13, or may cause the memory 12 to store the excretion information.

For instance, the memory 12 includes a storage device, such as a RAM (Random Access Memory), an SSD (Solid State Drive) or a flash memory, for storing various kinds of information. The memory 12 stores, for example, the excretion information, the reference toilet color data, and the setting information. The memory 12 may be a portable memory like a USB (Universal Serial Bus) memory.

The communication part 13 includes a communication circuit serving to connect the excrement determination device 1 to the server 3 via the network. The communication part 13 serves to connect the excrement determination device 1 and the sensor unit 2 to each other via the communication channel. The excretion information associates, for example, information about an occurrence of excretion (defecation, urination, and bleeding) with daily time information indicating an excretion date and time. For instance, the excrement determination device 1 may generate excretion information per day and transmit the generated excretion information to the server 3.

The entering and exiting sensor 14 includes, for example, a distance measurement sensor. The entering and exiting sensor 14 detects entering of the user into a toilet room where the toilet 100 is provided. Here, the distance measurement sensor constituting the entering and exiting sensor 14 has a lower measurement accuracy but a wider detection range than the distance measurement sensor constituting the sitting sensor 21. Examples of the distance measurement sensor include an infrared distance measurement sensor. The entering and exiting sensor 14 may include, for example, a human sensor in place of the distance measurement sensor. The human sensor detects the user located within a predetermined distance to the toilet 100.

Figure 4:
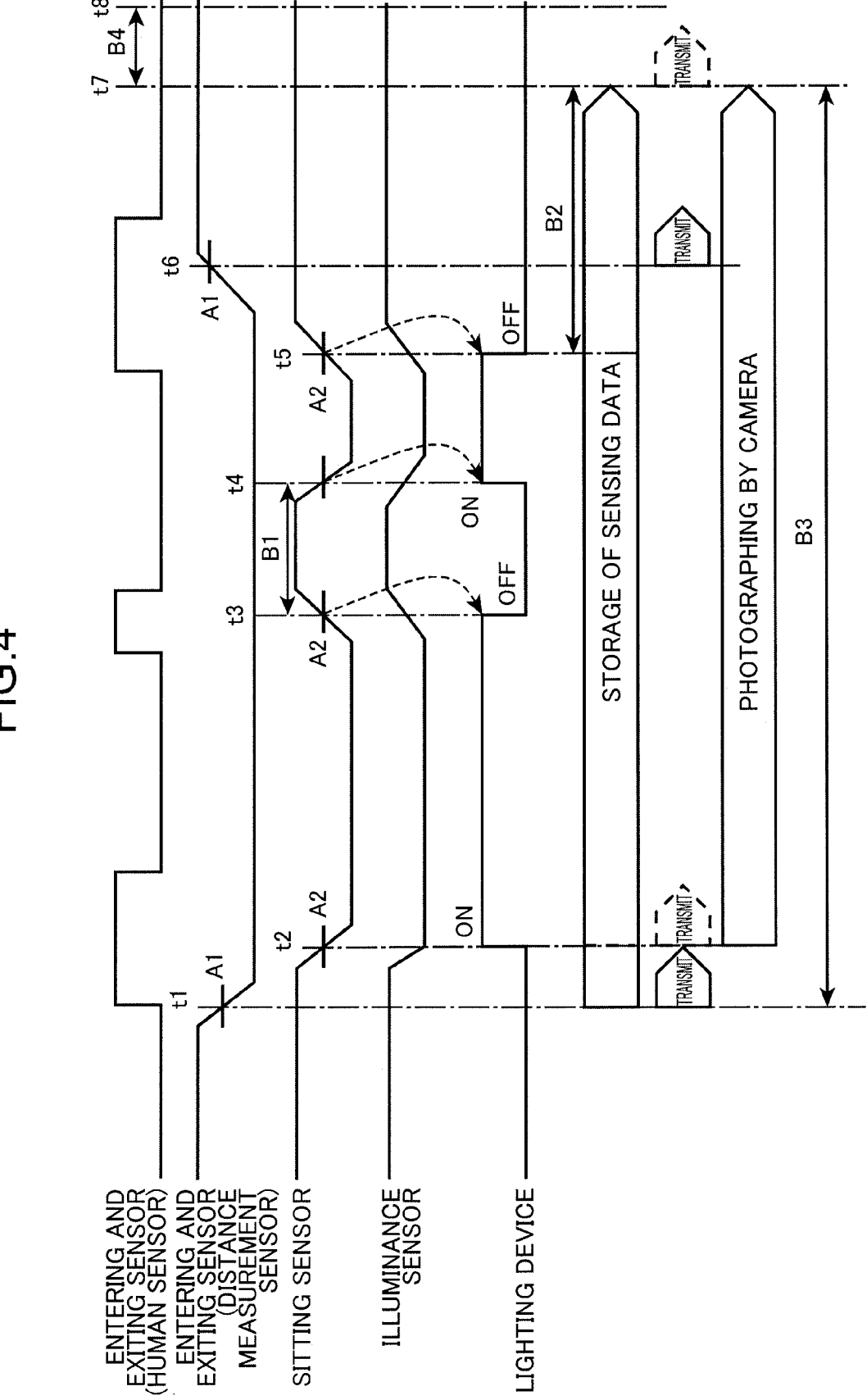
FIG. 4 is a sequence diagram showing an overview of a process by the excrement determination device in the first embodiment of the disclosure.

Heretofore, the configuration of the excrement determination system is described. Next, an overview of a process by the excrement determination device 1 will be described. FIG. 4 is a sequence diagram showing the overview of the process by the excrement determination device 1 in the first embodiment of the disclosure.

In FIG. 4, the first row shows a sequence about the entering and exiting sensor 14 in the form of the human sensor, the second row shows a sequence about the entering and exiting sensor 14 in the form of the distance measurement sensor, the third row shows a sequence about the sitting sensor 21, the fourth row shows a sequence about the illuminance sensor 22, and the fifth row shows a sequence about the lighting device 23. Although the example in FIG. 4 shows the sequences about both the entering and exiting sensor 14 in the form of the human sensor and the entering and exiting sensor 14 in the form of the distance measurement sensor, the excrement determination device 1 may include the entering and exiting sensor 14 in at least one of the forms.

At a time t1, a user enters the toilet room. In accordance with the entering, the calculation part 112 determines that the user has entered the toilet room on the basis of sensing data input from the entering and exiting sensor 14 in the form of the human sensor or the entering and exiting sensor 14 in the form of the distance measurement sensor. Here, the entering and exiting sensor 14 in the form of the human sensor sets the sensing data to "high" when detecting the user, and sets the sensing data to "low" when ceasing to detect the user. The calculation part 112 thus determines the entering of the user into the toilet room when the sensing data input from the entering and exiting sensor 14 in the form of the human sensor becomes "high". The calculation part 112 further determines the entering of the user into the toilet room when a distance value measured by the entering and exiting sensor 14 in the form of the distance measurement sensor reaches a threshold A1 or smaller. The threshold A1 can take an appropriate value, e.g., 50 cm, 100 cm, or 150 cm.

At the time t1, the calculation part 112 starts to store, in the memory 12, the sensing data input from the entering and exiting sensor 14, the sitting sensor 21, and the illuminance sensor 22.

At the time t1, the calculation part 112 transmits, to the server 3 by using the communication part 13, an entering notification indicating the entering of the user into the toilet room in response to the detection of the user.

At a time t2, the user sits on the toilet 100. In accordance with the sitting, a distance value input from the sitting sensor 21 reaches a sitting detection threshold A2 or smaller, and the calculation part 112 determines that the user has sit on the toilet 100. The sitting detection threshold A2 has, for example, a predetermined value indicating that the distance value from the sitting sensor 21 to the buttocks of the user shows sitting of the user onto the toilet 100. The sitting detection threshold A2 is smaller than the threshold A1, and can take an appropriate value, e.g., 10 cm, 15 cm, or 20 cm.

At the time t2, an illuminance value input from the illuminance sensor 22 decreases since the buttocks of the user block the external light entering the bowl 102 due to the sitting.

At the time t2, the calculation part 112 turns on the lighting device 23 in response to the detection of the sitting. The lighting device 23 lights up the inside of the bowl 102 to ensure a light amount necessary for detecting excrement from image data.

At the time t2, the calculation part 112 further activates the camera 24 to cause the camera 24 to photograph the inner part of the bowl 102. Thereafter, the acquisition part 111 acquires image data at a predetermined sampling rate.

The entering notification may be transmitted at the time t2.

In a period B1 from a time t3 to a time t4, re-sitting by the user onto the toilet 100 occurs. In accordance with the re-sitting, the distance value from the sitting sensor 21 exceeds the sitting detection threshold A2 at the time t3, and the distance value from the sitting sensor 21 falls below the sitting detection threshold A2 at the time t4. The calculation part 112 turns off the lighting device 23 at the time t3, and the calculation part 112 turns on the lighting device 23 at the time t4. The illuminance value from the illuminance sensor 22 also changes in conjunction with the distance value from the sitting sensor 21.

At a time t5, the user leaves the toilet 100. In accordance with the leaving, the distance value from the sitting sensor 21 exceeds the sitting detection threshold A2. The calculation part 112 turns off the lighting device 23 at the time t5.

The distance value from the entering and exiting sensor 14 exceeds the threshold A1 at a time t6, and hence, the calculation part 112 determines that the user has exited the toilet room. In accordance with the determination, the output part 114 transmits, to the server 3 by using the communication part 13, an exiting notification indicating the exiting of the user from the toilet room. At the time t6, the output part 114 transmits, to the server 3 by using the communication part 13, excretion information generated on the basis of image data. The exiting notification and the excretion information may be transmitted at a time t7. Moreover, the image data used for the detection of the excrement may be transmitted at the time t6.

At the time t7, the calculation part 112 finishes storing the sensing data into the memory 12 and further causes the camera 24 to finish photographing the inner part of the bowl 102 since the distance value from the sitting sensor 21 continuously exceeds the sitting detection threshold A2 for a period B2 from the time t5.

At a time t8, the calculation part 112 brings the excrement determination device 1 into a standby state since the entering and exiting sensor 14 in the form of the human sensor continuously indicates a "high" state for a period B4 from the time t7.

Figure 5:
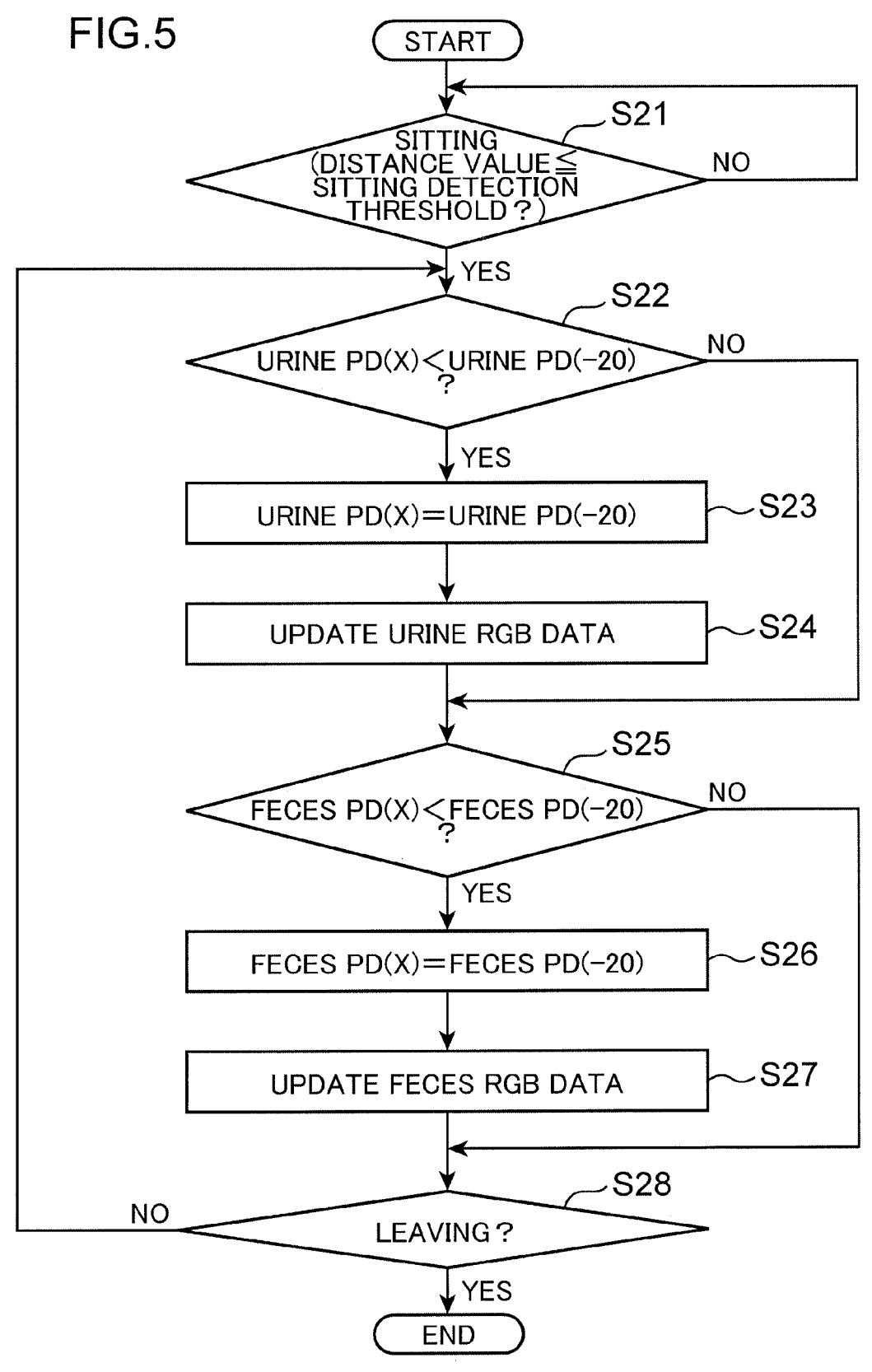
FIG. 5 is a flowchart showing an example of generation of transmission target image data by the excrement determination device.

Subsequently, a process by the excrement determination device 1 will be described. FIG. 5 is a flowchart showing an example of generation of transmission target image data by the excrement determination device 1.

In step S21, the calculation part 112 determines whether a user sits on the toilet 100. Here, the calculation part 112 determines that the user sits when a distance value acquired from the sitting sensor 21 by the acquisition part 111 reaches the sitting detection threshold A2 or smaller (YES in step S21), and leads the process to step S22. When the distance value is larger than the sitting detection threshold A2 (NO in step S21), the calculation part 112 makes the process wait in step S21 in standby.

In step S22, the calculation part 112 determines whether urine pixel count data PD(X) is smaller than urine pixel count data PD(−20). The urine pixel count data PD indicates pixel data of the number of pixels that satisfies the urine condition in the detection area data. The urine pixel count data PD(−20) indicates urine pixel count data in the detection area data at a twenty-previous sampling point (t−20) from a newest sampling point. The urine pixel count data PD(X) indicates a maximum value of the urine pixel count data PD in past further prior to the sampling point (t−20) after start of the process in FIG. 5. The process proceeds to step S23 when the urine pixel count data PD(X) is smaller than the urine pixel count data PD(−20) (YES in step S22), and the process proceeds to step S25 when the urine pixel count data PD(X) is equal to or larger than the urine pixel count data PD(−20) (NO in step S22).

Here, the urine pixel count data PD(−20) at the twenty-previous sampling point is adopted, but this is just an example, and the pixel count data PD(T) at a specific previous sample point may be adopted. The same is applicable to feces pixel count data PD(−20) to be described later.

In step S23, the calculation part 112 updates the urine pixel count data PD(X) by substituting the urine pixel count data PD(−20) for the urine pixel count data PD(X).

In step S24, the calculation part 112 updates urine RGB data. The urine RGB data takes an average value of R values, an average value of G values, and an average value of B values in pixel data that satisfies the urine condition for each block R1 resulting from dividing the detection area data into a plurality of blocks R1 (FIG. 3).

As shown in FIG. 3, each block R1 shows image data obtained by, for example, dividing the detection area data for the detection area D1 into 64 divisions in total=8 rows×8 columns.

Here, the blocks R1 are given their respective block numbers 1 to 64 from an upper-right block R1 to a lower-left block R1 in the Raster scanning order. The urine RGB data includes, in each block R1, an average value of R values, an average value of G values, and an average value of B values of pixel data satisfying the urine condition. For instance, when a specific block R1 has pixel data of the number Q1 of pixels that satisfies the urine condition, the calculation part 112 calculates, as the urine RGB data, the average value of the R values, the average value of the G values, and the average value of the B values of the pixel data of the number Q1 of pixels. Therefore, the urine RGB data includes sixty-four R values, G values, and B values. Here, the block R1 is obtained by dividing the detection area data into divisions of 8 rows×8 columns. However, this is just an example, and the block R1 may be obtained by dividing the detection area data into divisions of n (which is an integer of 2 or more) rows×m (which is an integer of 2 or more) columns. In step S11 in FIG. 6 to be described later, the urine RGB data having this data structure is included in the excretion information and transmitted together therewith, and thus, the data amount of the excretion information is reduced. Further, the urine RGB data is blurred, and thus attains privacy protection more effectively than image data itself in terms of management.

Steps S22 to S24 allow urine RGB data at a sampling point where the urine pixel count data PD reaches the maximum to serve as transmission target RGB data.

In step S25, the calculation part 112 determines whether feces pixel count data PD(X) is smaller than feces pixel count data PD(−20). The feces pixel count data PD indicates pixel data of the number of pixels that satisfies the feces condition in the detection area data. The feces pixel count data PD(−20) indicates feces pixel count data in the detection area data at a twenty-previous sampling point (t−20) from a newest sampling point (t). The feces pixel count data PD(X) indicates a maximum value of the feces pixel count data PD in past further prior to the sampling point (t−20) after start of the process in FIG. 5. The process proceeds to step S26 when the feces pixel count data PD(X) is smaller than the feces pixel count data PD(−20) (YES in step S25), and the process proceeds to step S28 when the feces pixel count data PD(X) is equal to or larger than the feces pixel count data PD(−20) (NO in step S25).

In step S26, the calculation part 112 updates the feces pixel count data PD(X) by substituting the feces pixel count data PD(−20) for the feces pixel count data PD(X).

In step S27, the calculation part 112 updates feces RGB data. The feces RGB data has the same data structure as the urine RGB data.

Steps S25 to S27 allow the feces RGB data at a sampling point where the feces pixel count data PD reaches the maximum to serve as transmission target RGB data.

In step S28, the calculation part 112 determines whether the user leaves the seat. Here, the calculation part 112 determines the leaving of the user when a distance value from the sitting sensor 21 continuously exceeds the sitting detection threshold A2 for the period B2, and determines no leaving of the user when the distance value falls below the sitting detection threshold A2 or the distance value does not continuously exceed the sitting detection threshold A2 for the period B2. The process returns to step S22 when the no leaving of the user is determined (NO in step S28), and the process is finished when the leaving of the user is determined (YES in step S28).

Figure 6:
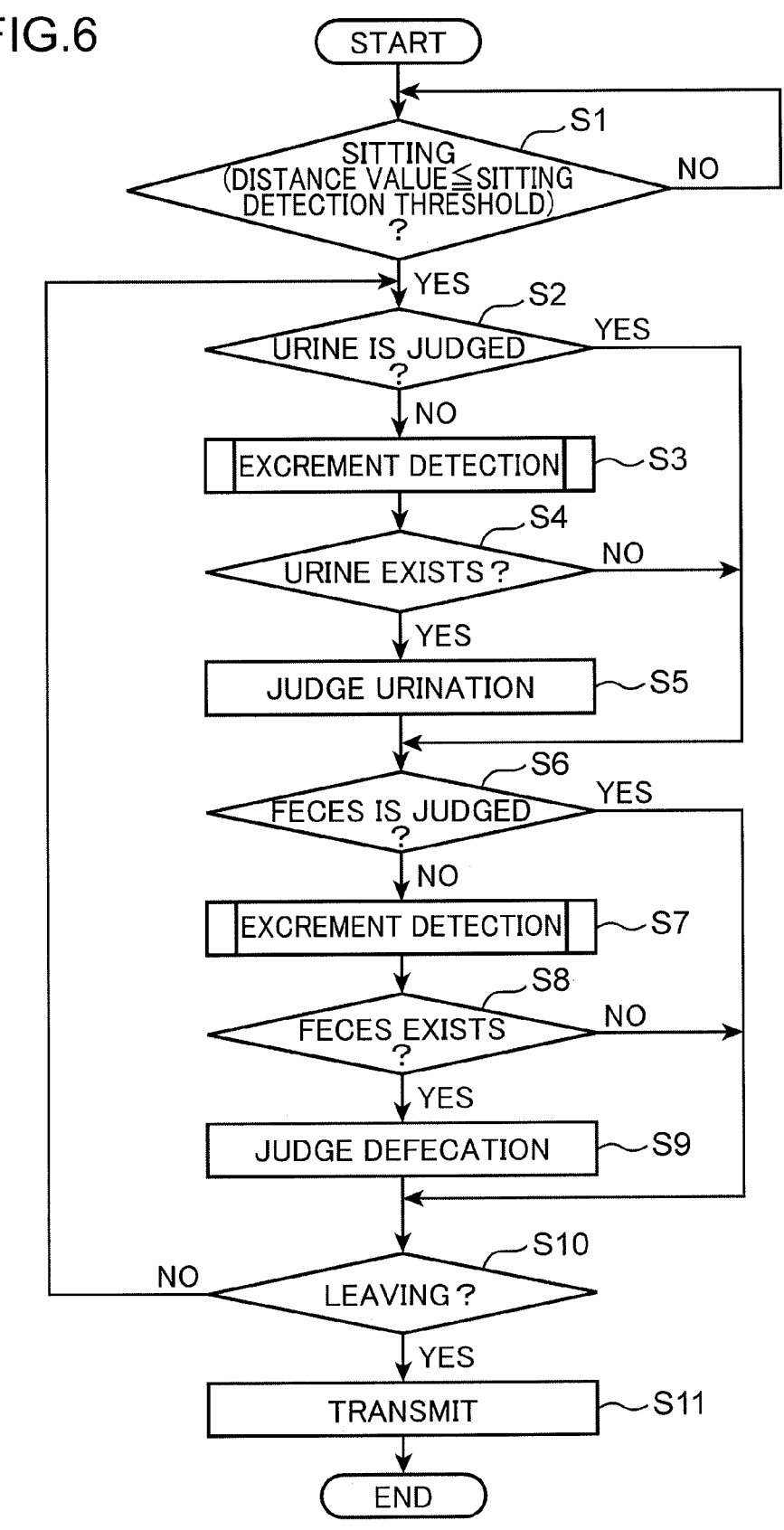
FIG. 6 a flowchart showing an example of a process in a period from sitting of a user onto a seat to leaving of the user from the seat in the excrement determination device in the first embodiment.

FIG. 6 a flowchart showing an example of a process in a period from sitting of the user onto the seat to leaving of the user from the seat in the excrement determination device 1 in the first embodiment. The flowchart in FIG. 6 parallels the flowchart in FIG. 5.

In step S1, the calculation part 112 determines whether the user sits on the toilet 100. Here, the calculation part 112 determines whether the user sits on the toilet 100 by determining whether a distance value acquired from the sitting sensor 21 by the acquisition part 111 reaches the sitting detection threshold A2 or smaller in the same manner as step S21 in FIG. 5. The process proceeds to step S2 when it is determined that the user sits on the toilet 100 (YES in step S1), and the process waits in step S1 in standby when it is determined that the user does not sit on the toilet 100 (NO in step S1).

In step S2, the determination part 113 determines whether urination is judged. The process proceeds to step S3 when the urination is not judged (NO in step S2), and the process proceeds to step S6 when the urination is judged (YES in step S2). The judgment of the urination stands for certainty that image data includes an image of urine.

In step S3, the determination part 113 executes, on the basis of image data, excrement detection to determine an occurrence of at least one of urination and defecation by the user. The excrement detection will be described in detail later with reference to FIG. 7.

When it is determined in the excrement detection that the urine exists in step S4 (YES in step S4), the determination part 113 judges the urination (step S5). When no urine is detected in the excrement detection (NO in step S4), the processing proceeds to step S6.

In step S6, the determination part 113 determines whether defecation is judged. The process proceeds to step S10 when the defecation is judged (YES in step S6), and the process proceeds to step S7 when the defecation is not judged (NO in step S6). The judgment of the defecation stands for certainty that image data includes an image of feces.

In step S7, the determination part 113 executes the excrement detection.

When it is determined that feces exists in the excrement detection in step S8 (YES in step S8), the determination part 113 judges defecation (step S9). When it is not determined that feces exists in the excrement detection (NO in step S8), the determination part 113 leads the process to step S10.

In step S10, the calculation part 112 determines whether the user leaves the seat. Here, the calculation part 112 determines the leaving of the user when a distance value from the sitting sensor 21 continuously exceeds the sitting detection threshold A2 for the period B2 in the same manner as in step S28 in FIG. 5. The process proceeds to step S11 when the distance value is larger than the sitting detection threshold A2 (YES in step S10), and the process returns to step S2 when the distance value reaches the sitting detection threshold A2 or smaller (NO in step S10).

In step S11, the output part 114 transmits an exiting notification and excretion information to the server 3 by using the communication part 13. The excretion information includes the urine RGB data, the feces RGB data, the urine pixel count data PD(X), and the feces pixel count data PD(X) each calculated in the flowchart in FIG. 5.

Figure 7:
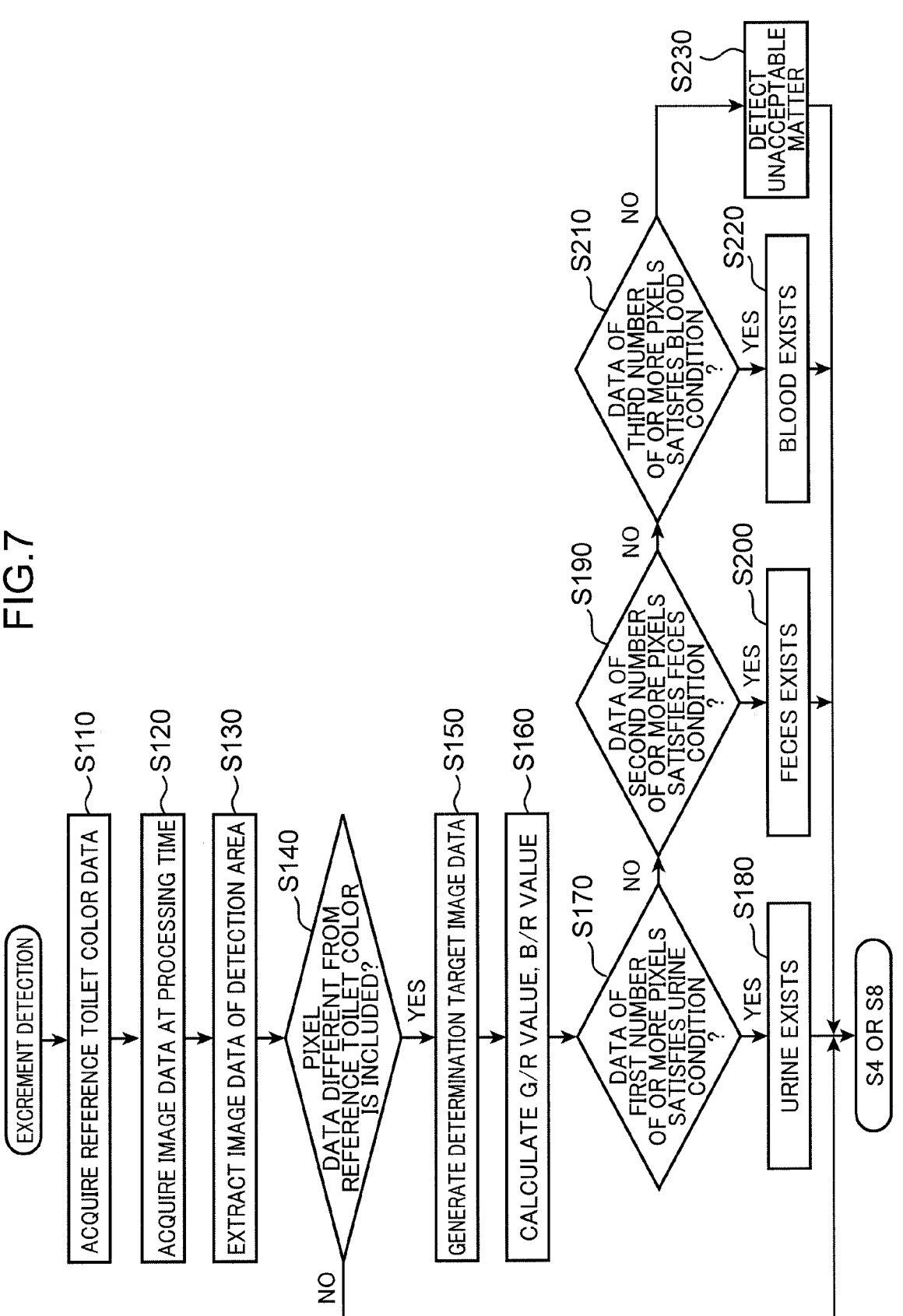
FIG. 7 is a flowchart showing an example of excrement detection.

Subsequently, the excrement detection will be described. FIG. 7 is a flowchart showing an example of the excrement detection.

In step S110, the calculation part 112 acquires reference toilet color data from the memory 12.

In step S120, the calculation part 112 acquires image data at a processing time from the image data acquired by the acquisition part 111. The image data at the processing time includes, for example, image data from a newest sampling point to a predetermined previous sampling point (e.g., twenty-previous sampling point). However, this is just an example, and the image data at the processing time may be the image data at the newest sampling point.

In step S130, the calculation part 112 extracts image data or detection area data of the detection area D1 from the image data at the processing time.

In step S140, the calculation part 112 determines whether the detection area data includes pixel data indicating a color different from the reference toilet color. The processing proceeds to step S150 when the detection area data includes pixel data indicating a color different from the reference toilet color (YES in step S140), and the processing proceeds to step S4 or S8 (FIG. 6) when the detection area data does not include the pixel data indicating a color different from the reference toilet color (NO in step S140).

In step S150, the calculation part 112 generates determination target image data by removing, from the detection area data, pixel data having R values, G values, and B values each being beyond a predetermined range with respect to R values, G values, and B values of the reference toilet color data.

In step S160, the calculation part 112 calculates a G/R value and a B/R value for pixel data in the determination target image data.

In step S170, the determination part 113 determines whether the determination target image data includes data of the first number of or more pixels that satisfies the urine condition. FIG. 8 is a table listing the feces condition, the urine condition, and the blood condition. In FIG. 8, the sign "Low" indicates a lower limit threshold of a condition satisfying range, and the sign "High" indicates an upper limit threshold of the condition satisfying range.

The urine condition includes a condition that the G/R value is B1% or more to B2% or less, and the B/R value is B3% or more to B4% or less. However, B3% is less than B1%, and B4% is less than B2%. The processing proceeds to step S180 when pixel data of the first number of or more pixels satisfies the urine condition (YES in step S170), and the processing proceeds to step S190 when pixel data of the number of pixels that is smaller than the first number satisfies the urine condition (NO in step S170).

In step S180, the determination part 113 determines that the processing target image data shows existence of urine, and leads the processing to step S4 or S8 (FIG. 6).

In step S190, the determination part 113 determines whether the determination target image data includes data of the second number of or more pixels that satisfies the feces condition. With reference to FIG. 8, the feces condition includes a condition that the G/R value is 0% or more to A1% or less, and the B/R value is 0% or more to A2% or less. However, A2% is less than A1%. The processing proceeds to step S200 when pixel data of the second number of or more pixels satisfies the feces condition (YES in step S190), and the processing proceeds to step S210 when pixel data of the number of pixels that is smaller than the first number satisfies the feces condition (NO in step S190).

In step S200, the determination part 113 determines that the processing target image data shows existence of feces, and leads the processing to step S4 or step S8 (FIG. 6).

In step S210, the determination part 113 determines whether the determination target image data includes data of the third number of or more pixels that satisfies the blood condition. With reference to FIG. 8, the blood condition includes a condition that the G/R value is 0% or more to C1% or less, and the B/R value is 0% or more to C2% or less. However, C2% is less than C1%. The processing proceeds to step S220 when pixel data of the third number of or more pixels satisfies the blood condition (YES in step S210), and the processing proceeds to step S230 when pixel data of the number of pixels that is smaller than the second number satisfies the blood condition (NO in step S210).

In step S220, the determination part 113 determines that the processing target image data shows existence of blood, and leads the processing to step S4 or S8 (FIG. 6).

In step S230, the determination part 113 determines that the determination target image data includes an image of an unacceptable matter, and leads the processing to step S4 or S8 (FIG. 6). Examples of the unacceptable matter include a diaper and toilet paper.

In FIG. 8, the feces condition, the urine condition, and the blood condition may have the relationship "C2%<C1%<A2%<B3%<B1%=A1%<B4%<B2%".

In detail, for instance, A1 indicates 80 or more to 90 or less, and preferably 83 or more to 87 or less.

For instance, A2 indicates 40 or more to 50 or less, and preferably 43 or more to 47 or less.

For instance, B1 indicates 80 or more to 90 or less, and preferably 83 or more to 87 or less.

For instance, B2 indicates 100 or more to 110 or less, and preferably 103 or more to 107 or less.

For instance, B3 indicates 45 or more to 55 or less, and preferably 48 or more to 52 or less.

For instance, B4 indicates 92 or more to 103 or less, and preferably 95 or more to 99 or less.

For instance, C1 indicates 32 or more to 42 or less, and preferably 35 or more to 39 or less.

For instance, C2 indicates 22 or more to 31 or less, and preferably 25 or more to 29 or less.

According to the first embodiment described heretofore, image data is determined whether to include an image of at least one of feces, urine, and blood on the basis of a G/R value and a B/R value. Here, each of the G/R value and the B/R value has characteristics that the value is maintainable even when a color of excrement in a surface layer of pooled water fades over time. This results in achieving accurate detection of the excrement in the pooled water in the toilet.

Second Embodiment

Figure 9:
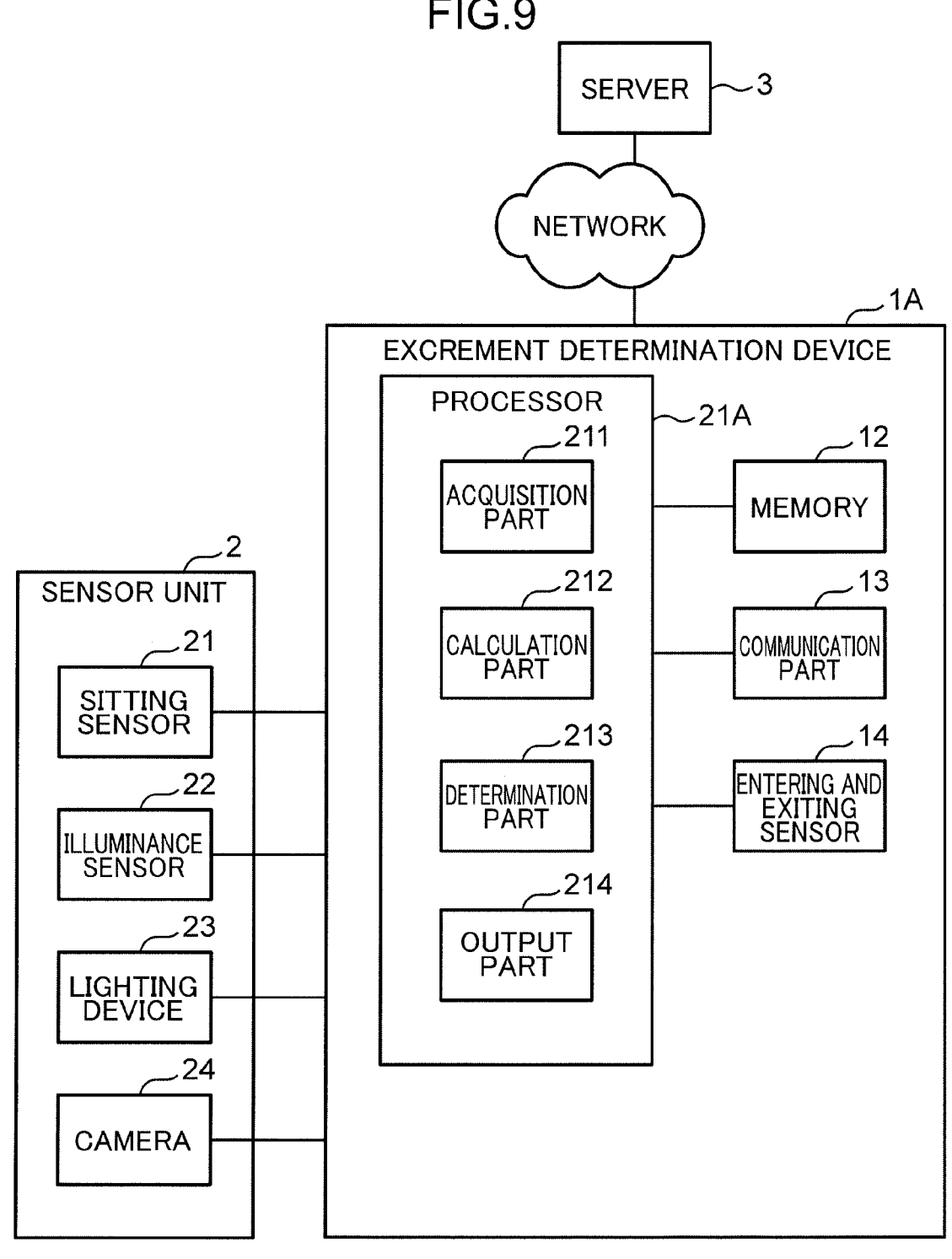
FIG. 9 is a block diagram showing an example of a configuration of an excrement determination system in a second embodiment.

A second embodiment aims at determining whether image data includes an image of blackish feces and an image of orangish feces. FIG. 9 is a block diagram showing an example of a configuration of an excrement determination system in the second embodiment. In the second embodiment, constituent elements which are the same as those in the first embodiment are given the same reference numerals and signs, and thus explanation therefor will be omitted.

A processor 21A included in an excrement determination device 1A has an acquisition part 211, a calculation part 212, a determination part 213, and an output part 214. The acquisition part 211, the calculation part 212, and the output part 214 are respectively equivalent to the acquisition part 111, the calculation part 112, and the output part 114.

The determination part 213 determines that the image data includes an image of blackish feces when a G/R value and a B/R value each calculated by the calculation part 212, and an R value, a G value, and a B value each included in the image data or determination target image data satisfy a predetermined blackish feces condition. The blackish feces has a dark gray color. The blackish feces may be excreted in intake of a medicine, such as sodium potassium ferrous citrate. The blackish feces cannot be accurately determined under the feces condition discussed in the first embodiment. Accordingly, the blackish feces condition is defined in the second embodiment.

The determination part 213 determines that the image data includes an image of orangish feces when each of an R value, a G value, and a B value included in image data or determination target image data satisfies a predetermined orangish feces condition.

A user may excrete orange-colored feces (orangish feces) attributed to intake of a certain medicine. Such orangish feces may be misrecognized as urine. Accordingly, the orangish feces condition is defined in the second embodiment.

Figure 10:
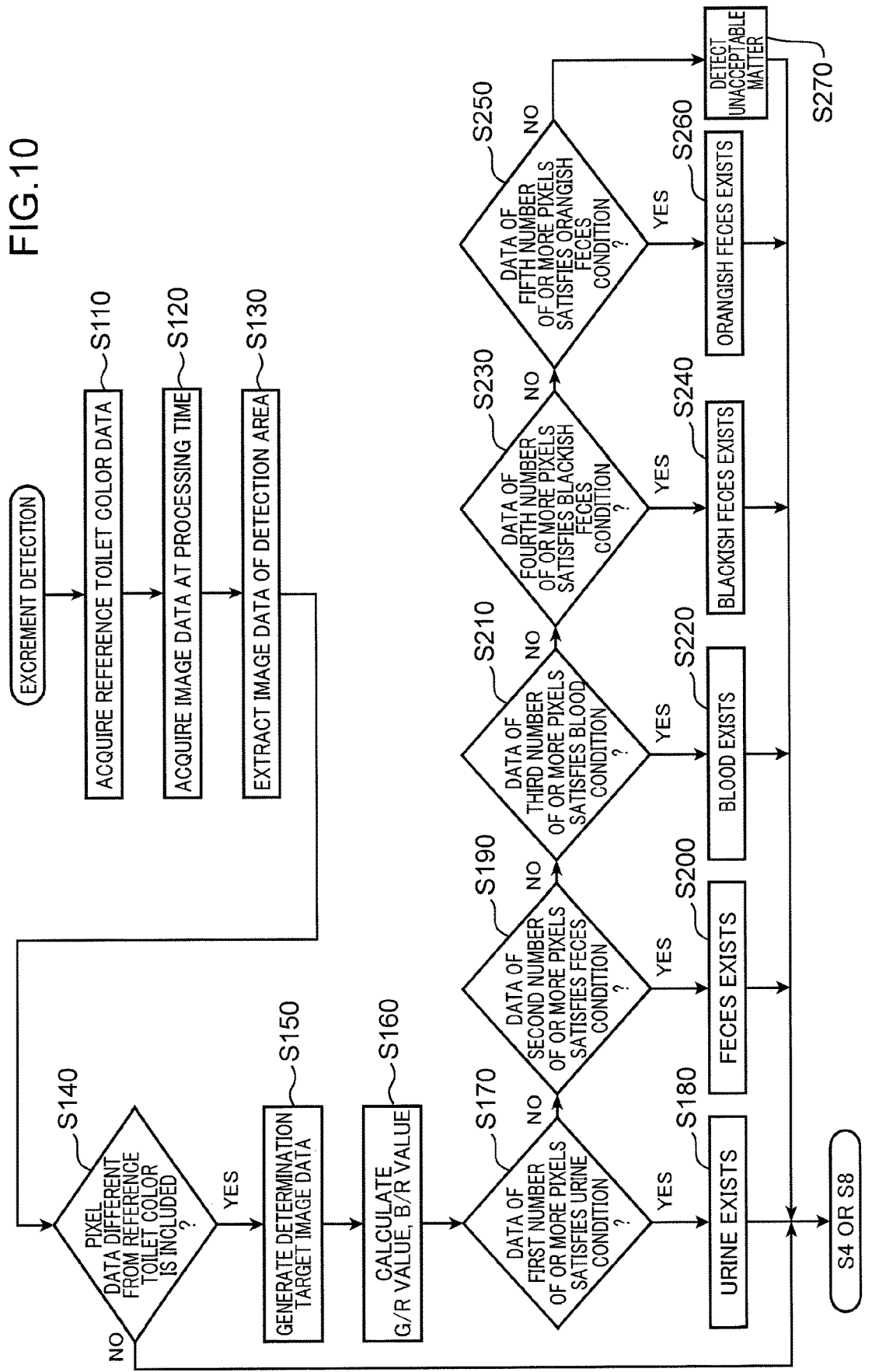
FIG. 10 a flowchart showing an example of excrement detection in the second embodiment.

FIG. 10 is a flowchart showing an example of excrement detection in the second embodiment. Steps S110 to S220 are the same as those in FIG. 7.

The processing proceeds to step S230 when pixel data of the number of pixels that is smaller than the third number of pixels satisfies the blood condition (NO in step S210).

In step S230, the determination part 113 determines whether the determination target image data includes data of a fourth number of or more pixels that satisfies the blackish feces condition. The fourth number of pixels represents a preset number of pixels of pixel data that satisfies the blackish feces condition, the pixel data not indicating a noise but indicating pixel data of blackish feces.

FIG. 11 is a table showing the blackish feces condition. The blackish feces condition includes a condition that a G/R value is D1% or more to D2% or less, a B/R value is D3% or more to D4% or less, and each of the R value, the G value, and the B value indicates 0 or more to E or less. For example, D3% may be less than D1%, and D4% may be equal to D2%. When the image data takes eight bits, each of the R value, the G value, and the B value takes 0 or more to 255 or less, and thus E indicates 0 or more to 255 or less.

In detail, for instance, D1 indicates 85 or more to 95 or less, and preferably 88 or more to 92 or less.

For instance, D2 indicates 105 or more to 115 or less, and preferably 108 or more to 112 or less.

For instance, D3 indicates 55 or more to 65 or less, and preferably 58 or more to 62 or less.

For instance, D4 indicates 105 or more to 115 or less, and preferably 108 or more to 112 or less.

When the image data takes eight bits, E indicates, for example, 85 or more to 95 or less, and preferably 88 or more to 92 or less. When the image data takes a predetermined number of bits, E indicates, for example, 33% or more to 37% or less, and preferably 34% or more to 36% or less.

The processing proceeds to step S240 when pixel data of the fourth number of or more pixels satisfies the blackish feces condition (YES in step S230), and the process proceeds to step S250 when pixel data of the number of pixels that is smaller than the fourth number of pixels satisfies the blackish feces condition (NO in step S230).

In step S240, the determination part 113 determines that the processing target image data shows existence of blackish feces, and leads the processing to step S4 or Step S8 (FIG. 6). In this case, defecation is judged in step S6 (FIG. 6).

In step S250, the determination part 113 determines whether the determination target image data includes data of a fifth number of or more pixels that satisfies the orangish feces condition. The fifth number of pixels represents a preset number of pixels of pixel data that satisfies the orangish feces condition, the pixel data not indicating a noise but indicating data of orangish feces.

FIG. 12 is a table showing the orangish feces condition. The orangish feces condition includes a condition that each of the R value, the G value, and the B value indicates F1 or more to F2 or less. When the image data takes eight bits, each of F1 and F2 takes a value of 0 or more to 255 or less.

In detail, for instance, when the image data takes eight bits, F1 indicates 95 or more to 105 or less, and preferably 98 or more to 102 or less. When the image data takes a predetermined number of bits, F1 indicates, for example, 37% or more to 41% or less, and preferably 38% or more to 40% or less.

For instance, when the image data takes eight bits, F2 indicates 245 or more to 255 or less, and preferably 250 or more to 255 or less. When the image data takes a predetermined number of bits, F2 indicates, for example, 96% or more to 100% or less, and preferably 98% or more to 100% or less.

The processing proceeds to step S260 when pixel data of the fifth number of or more pixels satisfies the orangish feces condition (YES in step S250), and the process proceeds to step S270 when pixel data of the number of pixels that is smaller than the fifth number of pixels satisfies the orangish feces condition (NO in step S250).

In step S260, the determination part 113 determines that the processing target image shows existence of orangish feces, and leads the processing to step S4 or Step S8 (FIG. 6). In this case, defecation is judged in step S6 (FIG. 6).

In step S270, the determination part 113 determines that the determination target image includes an image of an unacceptable matter, and leads the processing to step S4 to S8 (FIG. 6). Examples of the unacceptable matter include a diaper and toilet paper.

As described heretofore, the second embodiment enables determination as to whether image data includes an image of each of blackish feces and orangish feces.

This disclosure can adopt modifications described below.

(1) In the second embodiment, the orangish feces condition shown in step S250 may be provided after pixel data of the first number of or more pixels satisfies the urine condition (YES in step S270). In this case, the determination part 113 may determine the existence of the orangish feces when pixel data of the fifth number of or more pixels satisfies the orangish feces condition as well as the urine condition.

(2) In step S170 in FIG. 7, determination is made "YES" when data of the first number of or more pixels satisfies the urine condition, but this is just an example, and determination may be made "YES" with existence of pixel data that satisfies the urine condition. In this case, only a single pixel of data that satisfies the urine condition is sufficient to determine the existence of an image of urine. Such determination is applicable to the feces condition, the blood condition, and the orangish feces condition.

INDUSTRIAL APPLICABILITY

The present disclosure is useful to accurately detect excrement from image data.

The invention claimed is:

1. An excrement determination method for an excrement determination device having a processor that improves detection of the presence of excrement, urine, or blood in a bowl of a toilet using the processor, the excrement determination method comprising:

sensing with a sitting sensor attached to the toilet that a user is sitting on the toilet and inputting a sitting result from the sitting sensor into a processor;

illuminating the bowl with a lighting device in response to instructions from the processor and the sensing of the sitting of the user on the toilet;

continuously acquiring with the processor image data of excrement in color captured by a camera which is provided to photograph an inner part of the bowl of the toilet illuminated in the illuminating operation;

calculating with the processor a G/R value and a B/R value on the basis of an R (red) value, a G (green) value, and a B (blue) value each included in each pixel of the image data;

setting with the processor a predetermined feces-detection condition for detecting the presence of feces in the toilet, a predetermined urine-detection condition for detecting the presence of urine in the toilet, and a predetermined blood-detection condition for detecting the presence of blood in the toilet;

calculating, with the processor, for each of images of the toilet bowl in a sitting period sensed in the sensing operation, the number of pixels falling within a predetermined range of the G/R value and a predetermined range of the B/R value with respect to each of the feces-detecting condition, the urine-detecting condition, and the blood-detecting condition;

determining, with the processor, on the basis of the number of pixels falling within the predetermined range of the G/R value and the number of pixels falling within the predetermined range of the B/R value, whether the image data includes an image of at least one of the urine, the feces, and the blood; and outputting from the processor a result of the determination, wherein the result of the determination includes feces RGB data generated from image data having a maximum number of pixels that satisfies the feces-detecting condition in the sitting period, or urine RGB data generated from image data having a maximum number of pixels that satisfies the urine-detecting condition in the sitting period.

2. The excrement determination method according to claim 1, wherein, in the determining operation, the image data is determined to include an image of blackish feces when each of the G/R value, the B/R value, the R value, the G value, and the B value satisfies a predetermined blackish feces condition.

3. The excrement determination method according to claim 1, wherein, in the determining operation, the image data is determined to include an image of orangish feces when each of the R value, the G value, and the B value satisfies a predetermined orangish feces condition.

4. The excrement determination method according to claim 1, wherein the feces-detecting condition includes a condition that the G/R value is smaller than A1% and the B/R value is smaller than A2%, which is less than A1%.

5. The excrement determination method according to claim 1, wherein the urine-detecting condition includes a condition that the G/R value ranges from B1% to B2%, and the B/R value ranges from B3% to B4%, B3% being less than B1%, B4% being less than B2%.

6. The excrement determination method according to claim 1 wherein the blood-detecting condition includes a condition that the G/R value is smaller than C1% and the B/R value is smaller than C2%, which is less than C1%.

7. The excrement determination method according to claim 2, wherein the blackish feces condition includes a condition that the G/R value ranges from D1% to D2%, the B/R value ranges from D3% to D4%, and each of the R value, G value, and the B value is smaller than E, D3% being less than D1%, and D4% being equal to D2%.

8. The excrement determination method according to claim 3, wherein the orangish feces condition includes a condition that each of the R value, the G value, and the B value ranges from F1 to F2.

9. The excrement determination method according to claim 1, wherein in the determining operation, the image data is determined to include an image of the feces when the image data includes data of a first number of or more pixels that satisfies the feces-detecting condition, the image data is determined to include an image of the urine when the image data includes data of a second number of or more pixels that satisfies the urine-detecting condition, and the image data is determined to include an image of blood when the image data includes data of a third number of or more pixels that satisfies the blood-detecting condition.

10. The excrement determination method according to claim 1, wherein, in the G/R-value and the B/R-value calculating operation, the G/R value and the B/R value are determined on the basis of an R value, a G value, and a B value of image data of a predetermined detection area including a pool part of the toilet bowl.

11. An excrement determination device that improves the detection of the presence of excrement, urine, or blood in a bowl of a toilet, comprising:

a sitting sensor attached to the toilet and configured to detect that a user is sitting on the toilet;

a lighting device configured to illuminate the toilet bowl; and a processor configured to receive a signal from the sitting sensor to whether the user is sitting on the toilet, control the lighting device by transmitting an instruction to the lighting device to turn on the lighting device to illuminate the toilet bowl in response to determining that the user is sitting on the toilet in response to receiving the signal from the sitting sensor, continuously acquire image data of excrement in color captured by a camera which is provided to photograph the bowl of the toilet illuminated by the lighting device, calculate a G/R value and a B/R value on the basis of an R (red) value, a G (green) value, and a B (blue) value each included in each pixel of the image data, set a predetermined feces-detection condition for detecting the presence of feces in the toilet, a predetermined urine-detection condition for detecting the presence of urine in the toilet, and a predetermined blood-detection condition for detecting the presence of blood in the toilet, calculate, for each of images of the toilet bowl in a sitting period sensed by the sitting sensor, the number of pixels falling within a predetermined range of the G/R value and a predetermined range of the B/R value with respect to each of the feces-detecting condition, the urine-detecting condition, and the blood-detecting condition, determine, on the basis of the number of pixels falling within the predetermined range of the G/R value and the number of pixels falling within the predetermined range of the B/R value, whether the image data includes an image of at least one of the feces, the urine, and the blood, output a result of the determination, wherein the result of the determination includes feces RGB data generated from image data having a maximum number of pixels that satisfies the feces-detecting condition in the sitting period, or urine RGB data generated from image data having a maximum number of pixels that satisfies the urine-detecting condition in the sitting period.

12. A non-transitory computer readable recording medium storing an excrement determination program that improves the detection of the presence of excrement, urine, or blood in a bowl of a toilet by causing a computer to serve as an excrement determination device, the excrement determination program causing the computer to perform operations comprising:

receiving signals from a sitting sensor attached to the toilet and sensing whether a user is sitting on the toilet, and determining that the user is sitting on the toilet in response to receiving predetermined signals from the sitting sensor;

instructing a lighting device to illuminate the bowl in response to determining that the user is sitting on the toilet;

continuously acquiring image data of excrement in color captured by a camera which is provided to photograph an inner part of the bowl of the toilet illuminated by the lighting device in response to instructions from the computer;

calculating a G/R value and a B/R value on the basis of an R (red) value, a G (green) value, and a B (blue) value each included in each pixel of the image data;

setting a predetermined feces-detection condition for detecting the presence of feces in the toilet, a predetermined urine-detection condition for detecting the presence of urine in the toilet, and a predetermined blood-detection condition for detecting the presence of blood in the toilet;

calculating, for each of images of the toilet bowl in a sitting period sensed in the sensing operation, the number of pixels falling within a predetermined range of the G/R value and a predetermined range of the B/R value with respect to each of the feces-detecting condition, the urine-detecting condition, and the blood-detecting condition;

determining, on the basis of the number of pixels falling within the predetermined range of the G/R value and the number of pixels falling within the predetermined range of the B/R value, whether the image data includes an image of at least one of the urine, the feces, and the blood; and outputting a result of the determination, wherein the result of the determination including feces RGB data generated from image data having a maximum number of pixels that satisfies the feces-detecting condition in the sitting period, or urine RGB data generated from image data having a maximum number of pixels that satisfies the urine-detecting condition in the sitting period.

* * * * *